Jan. 29, 1946.   V. L. BALBI   2,393,732
GARBAGE TRUCK
Filed Dec. 22, 1944
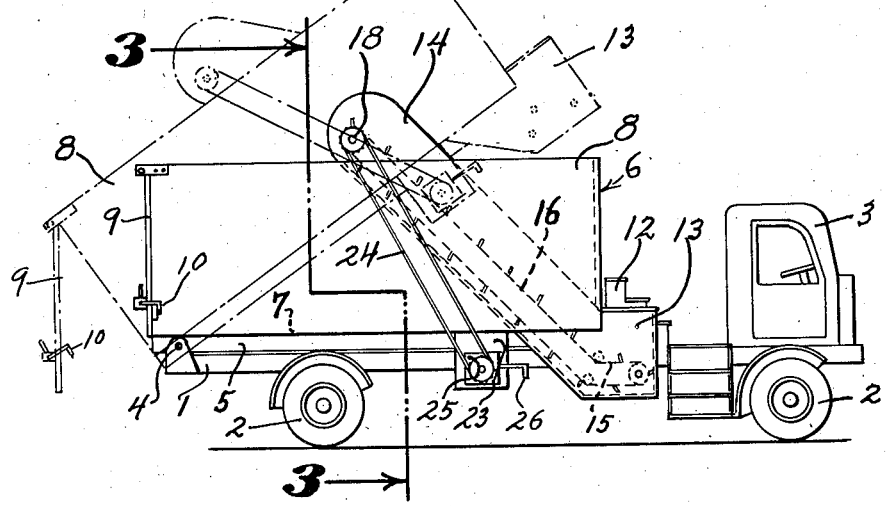
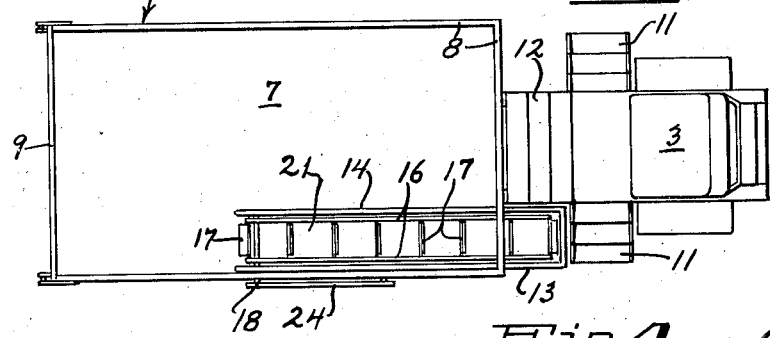
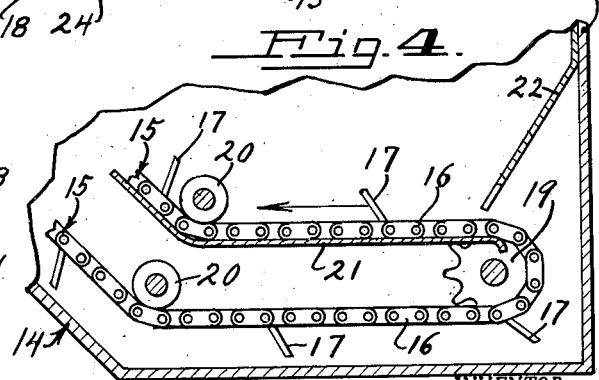
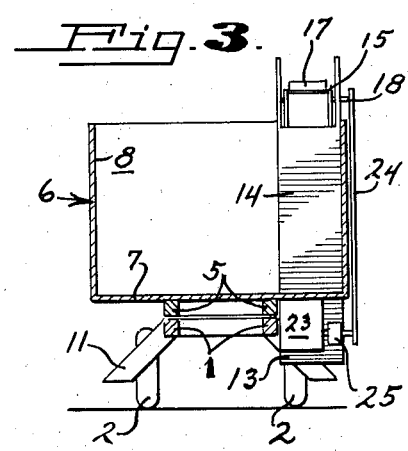
INVENTOR
Valentino L. Balbi
BY
J. E. Prabrucco
ATTORNEY.

Patented Jan. 29, 1946

2,393,732

UNITED STATES PATENT OFFICE 2,393,732

GARBAGE TRUCK

Valentino L. Balbi, South San Francisco, Calif.

Application December 22, 1944, Serial No. 569,657

3 Claims. (Cl. 214—67)

This invention relates to improvements in garbage trucks, and more particularly to improved loading means therefor.

An object of my invention is to provide an improved garbage or refuse truck having novel automatic conveyor means which is arranged to receive material deposited in a hopper located at a low accessible point at the forward end of the truck body, and convey the same upwardly and discharge it inside the body.

Another object of my invention is to provide an improved loading means for truck bodies, having a novel conveyor means which permits the convenient and expeditious transfer of garbage or other material into the truck body without the necessity of resorting to the tedious methods now commonly used.

A further object of my invention is to provide an improved truck body of the type equipped with high enclosing sides, having novel loading means which permits the automatic transfer of material into the truck from a receiving hopper arranged in a position where it can be manually loaded from the street level.

Other and further objects of my invention will be pointed out hereinafter, or will be indicated in the appended claims, or will be obvious to one skilled in the art upon an understanding of the present disclosure. For the purpose of this application I have elected to show herein certain forms and details of a garbage truck representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

In the accompanying drawing:

Fig. 1 is a side elevation of a garbage or refuse truck having my invention applied thereto;

Fig. 2 is a top plan view of the same;

Fig. 3 is a sectional view taken on the line 3—3 of Fig. 1; and

Fig. 4 is an enlarged sectional view illustrating the detailed construction of one end of the conveyor.

Referring to the drawing, the numeral 1 designates a truck chassis mounted in the usual way on wheels 2. At the forward end of the chassis is a truck engine (not shown) and a driver's cab 3.

Pivotally connected as at 4 to the rear end of the chassis 1 is a sub-frame 5 upon which is mounted an open truck body 6. The truck body comprises a bed or floor 7, high enclosing front and lateral sides 8 and a pivoted rear end 9 which may embody any one of a number of different constructions. In the particular embodiment shown on the drawing, the rear end of the truck body is pivotally connected at its upper end to the lateral sides 8, and when the said body is tilted (as shown by the broken lines in Fig. 1) to cause the discharge of the contents of the truck body, the said rear end automatically assumes an open position. Latch means 10 normally holds the rear end 9 in a closed position so the contents of the truck body cannot escape therefrom. The truck is provided in the usual manner with flights of steps 11 and 12 positioned behind the driver's cab 3 which permit the operators or loaders to manually carry material into positions where it can be lifted over the front end of the truck body and deposited therein. However, by employing my invention, the steps 11 and 12 need not be used in the loading of the truck, except in emergencies.

Secured to the truck body 6 or to the tiltable subframe 5 is a receiving hopper 13 for holding refuse, garbage or other material deposited therein for subsequent delivery into the truck body. The receiving hopper is positioned externally of the truck body and forwardly of the front side thereof. It extends beneath the bed 7 of the truck body and is preferably positioned at one side of the steps 12 and near one of the lateral sides 8 of the said body. The hopper 13 is so arranged that garbage, refuse or other material can be conveniently deposited into its open upper side by a person standing on the sidewalk adjacent the street upon which the truck is operating. In the bed 7 of the truck body at the particular front corner which is positioned directly behind the hopper 13 there is provided a rectangular opening through which an inclined trough-like frame 14 extends. The trough-like frame is open at its upper side and its outer side wall is suitably secured as by welding or other means to the adjacent lateral side 8 of the truck body. The lower front end of the frame 14 is rigidly secured to the rear end of the hopper 13, and its upper rear end is preferably arranged in a position well above the truck body.

An endless conveyor 15 having upper and lower flights is positioned inside the hopper 13 and the trough-like frame 14. The endless conveyor comprises spaced sprocket chains 16 which are joined by a plurality of parallel outwardly projecting spaced plates 17 which extend substantially across the interior of the hopper and the frame. The endless conveyor 15 extends over rotatable sprocket wheels (not shown in detail) secured to a drive shaft 18 at the upper end of the frame 14. The endless conveyor extends over sprocket wheels 19 rotatably mounted at the forward end of the hopper 13 near the bottom thereof. Suitably positioned rotatable idlers 20 secured in the forward end of the hopper 13 near its bottom engage with the upper and lower flights of the endless conveyor and maintain those parts of the endless conveyor located in the hopper in substantally horizontal positions. A stationary supporting panel or member 21 extending longitudinally through the hopper and the trough-like frame and arranged beneath the upper flight of the endless conveyor 15 supports the said upper flight so that it does not sag. The supporting member 21 also supports any material such as garbage or refuse when it is deposited in the hopper both while in said hopper and while it is being conveyed therefrom to a dumping position at the upper end of the frame. The outwardly projecting plates 17 of the upper flight of the endless conveyor 15 engage with the garbage or other material resting on that part of the supporting plate 21 which is located in the hopper, and carry it upwardly to a point where the endless conveyor passes over the shaft 18, and there it discharges the said material into the truck body where it is supported on the bed of the latter. An inclined deflector plate 22 secured to the front side of the hopper 13 is so arranged as to cause garbage, refuse or other material dumped into the forward end of the hopper to be deflected in a forward direction onto supporting member 21 where it can be engaged by the endless conveyor and carried upwardly through the trough-like frame to a position where it is discharged into the interior of the body 6.

Mounted on the sub-frame 5 is an engine or other source of power 23 which is operatively connected by a chain drive 24 to the drive shaft 18. A suitable clutch 25 arranged between and connected to the engine and the chain drive provides means for controlling the operation of the endless conveyor 15. A hand control lever 26 provides means for operating the clutch 25.

Having described my invention, what I claim is:

1. In a truck, a body having a bed and enclosing sides, a receiving hopper positioned at the front end of the body exteriorly thereof and near the bed, an inclined endless conveyor carried by the body and arranged so its receiving end is positioned inside the hopper and its discharge end is disposed inside the body well above the central area of the bed.

2. In a truck, a tiltable truck body having an open top, a bed and enclosing sides, a material receiving hopper secured exteriorly of and at the front end of the truck body and having its bottom arranged beneath the bed of the truck body, an inclined endless material conveyor having its receiving end positioned inside the hopper where it is arranged to engage with material in the hopper, the said conveyor extending through the bed to an elevated discharge position inside the truck body well above the central area of the bed, and means for actuating the endless conveyor.

3. In an automotive truck having a chassis, a sub-frame tiltably mounted on the chassis, a material holding truck body secured on the sub-frame and having a bed for supporting material discharged thereon, a receiving hopper mounted on the sub-frame and arranged exteriorly of and in front of the truck body, the said hopper having an open top and a closed bottom, the bottom of the hopper being disposed below the bed of the truck body, an endless inclined material conveyor extending through an opening in the bed of the truck from a point in the hopper where its receiving end is arranged to engage with material deposited therein to an elevated discharge point inside the truck body, and means for actuating the conveyor.

VALENTINO L. BALBI.